United States Patent [19]

Brand

[11] Patent Number: 4,500,053
[45] Date of Patent: Feb. 19, 1985

[54] PROPELLER AND ENGINE MOUNTING DEVICE

[76] Inventor: Rolf Brand, 212 N. Mecklenburg Ave., South Hill, Va. 23970

[21] Appl. No.: 403,697

[22] Filed: Jul. 30, 1982

Related U.S. Application Data

[63] Continuation-in-part of Ser. No. 213,458, Dec. 5, 1980, Pat. No. 4,382,566.

[51] Int. Cl.³ .................... B64C 11/00; B64D 27/00
[52] U.S. Cl. ................ 244/54; 244/DIG. 1; 244/69; 403/370; 464/161; 416/500
[58] Field of Search ............ 244/54, 55, 13, DIG. 1, 244/69, 65, 67; 384/215, 220, 221, 222, 223; 403/370, 374; 464/160, 161; 416/500, 170 R

[56] References Cited

U.S. PATENT DOCUMENTS

| | | | |
|---|---|---|---|
| 899,350 | 9/1908 | Steinhaus | 244/DIG. 1 |
| 1,038,633 | 9/1912 | O'Bryan | 244/DIG. 1 |
| 1,820,442 | 8/1931 | Cooper | 464/161 |
| 2,340,503 | 2/1944 | Barenyi | 384/222 |
| 2,608,451 | 8/1952 | Pierce, Jr. | 384/215 |
| 3,013,749 | 12/1961 | Dunham | 244/54 |
| 3,182,986 | 5/1965 | Brockman | 403/370 |
| 3,590,652 | 7/1971 | Strang | 403/370 |
| 3,649,054 | 3/1972 | McClenan | 403/374 |
| 3,726,109 | 4/1973 | Mortensen | 403/370 |
| 4,249,711 | 2/1981 | Godbersen | 244/54 |

FOREIGN PATENT DOCUMENTS 421136  2/1911  France ................ 244/DIG. 1

Primary Examiner—Galen L. Barefoot
Attorney, Agent, or Firm—Lalos, Leeds, Keegan, Lett, Marsh, Bentzen & Kaye

[57] ABSTRACT

A device for mounting an aircraft engine and a propeller on a longitudinal member or fuselage of a lightweight aircraft. A sleeve is disposed about the longitudinal member and securing devices which prevent longitudinal movement of the sleeve relative to the longitudinal member are positioned at either end of the sleeve. Vibration dampening rings are disposed between the securing devices and cups which can be threaded along the sleeve placing the rings in the desired compression. The engine and the propeller are mounted on the sleeve. A driving sleeve is rotatably mounted on the sleeve and is drivingly attached at one end to the output of the engine and is mounted at the other end to the propeller. The propeller is rotatable about the longitudinal axis of the longitudinal member and the wing structure and tail structure can be mounted on the longitudinal member as well with the propeller positioned between them. The mounting device can also be used for biplanes.

26 Claims, 9 Drawing Figures

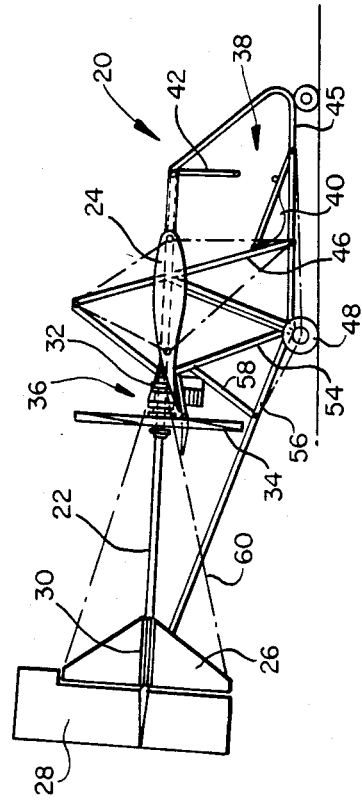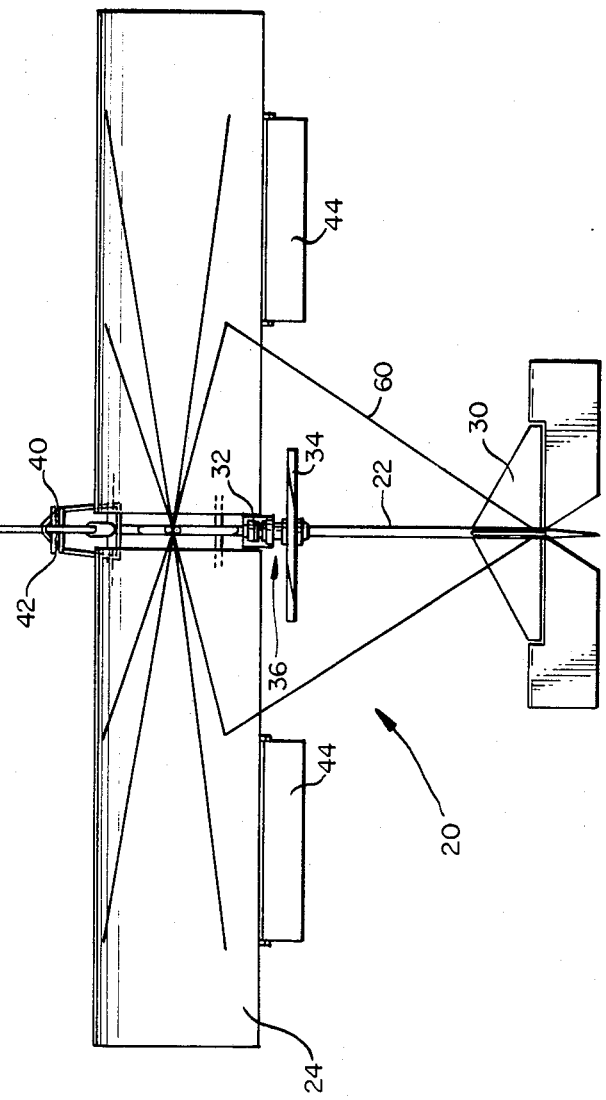

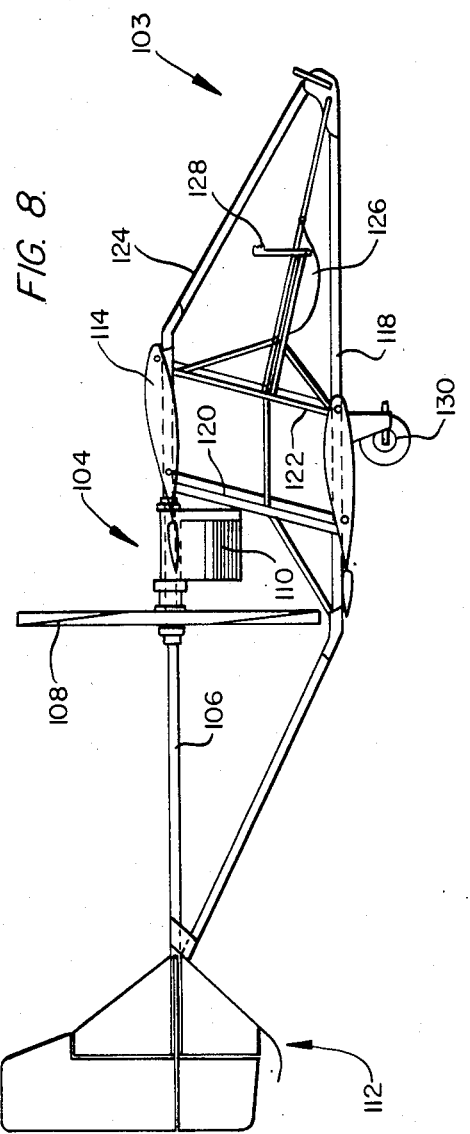
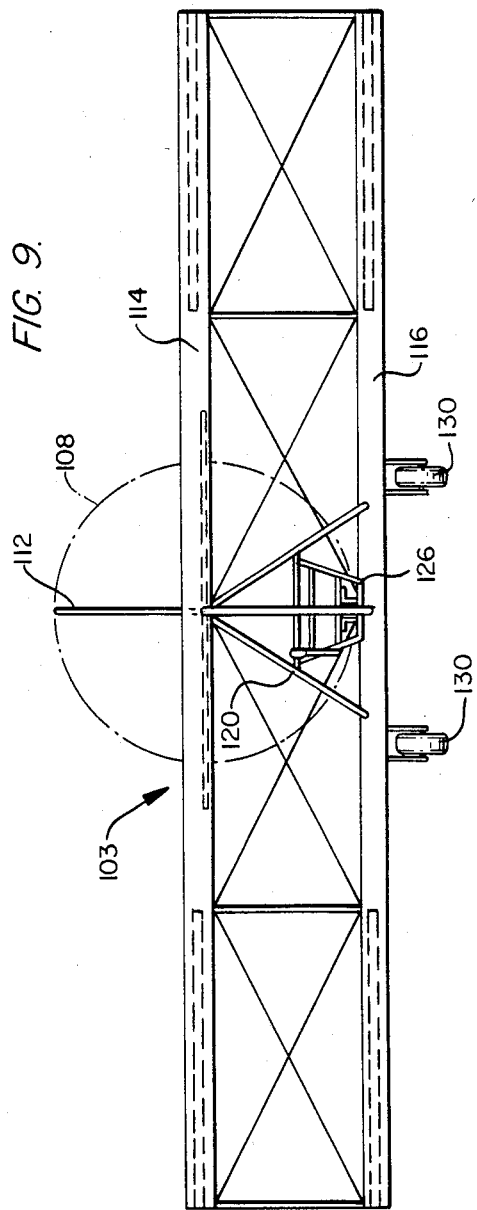

PROPELLER AND ENGINE MOUNTING DEVICE

This is a continuation-in-part of Ser. No. 213,458, filed on Dec. 5, 1980, which issued as U.S. Pat. No. 4,382,566 on May 10, 1983.

BACKGROUND OF THE INVENTION

This invention relates to a lightweight aircraft and more particularly to an ultralightweight aircraft having a novel propeller assembly. It further relates to a novel mounting system for the propeller and engine for such an aircraft.

This invention is a novel improvement over applicant's prior copending application, Ser. No. 213,458, filed Dec. 5, 1980, which issued as U.S. Pat. No. 4,382,566 on May 10, 1983, the disclosure of which is hereby incorporated in its entirety. That application shows a novel aircraft design in which the propellers were mounted for rotation about the principal longitudinal load-carrying structural member. The propellers were further positioned between the wing structure and the tail rudder and elevator assembly. This is a aerodynamically sound and lightweight design. It does not require additional structure for the prime mover separate from the principal longitudinal member. Additional structure can add unnecessary weight and cost to an ultralight aircraft. Thus, ultralightweight aircraft in the past have been affordable and maintainable by only a limited number of persons.

It is further necessary that the propeller and engine be so mounted as to minimize vibrational effect on the structural members. In addition to weakening these members and possibly damaging the propeller and engine, these vibrations can be distracting to the pilot of the aircraft or, at the least, be discomforting. The mounting system further should be simple of manufacture and easy to assemble. This is particularly important as these ultralightweight aircraft frequently are manufactured and sold in kit form, thus necessitating a design which is easy for the layman to assemble and disassemble. Further, the design should be such that the propeller and/or the engine can be easily removed for repair or replacement. It is also desirable that the mounting system be able to be securely attached to the longitudinal member.

OBJECTS OF THE INVENTION

Accordingly, it is the principal object of the present invention to provide an improved lightweight or ultra-lightweight aircraft design.

Another object of the present invention is to provide an improved propeller and engine mounting system for an ultralightweight aircraft.

A further object of the present invention is to provide an improved lightweight aircraft having a novel propeller assembly requiring no additional complex mounting structure.

A still further object is to provide an improved mounting system which is easy to manufacture, and easy to assemble and disassemble.

Another object is to provide an improved mounting system which can be securely and removably attached to a main longitudinal member of the aircraft.

A further object is to provide an improved engine and propeller mounting system which allows for the easy removal of the engine or the propeller for replacement or for repair.

A still further object is to provide a propeller and engine mounting system which minimizes the vibrational impact and damage to the aircraft.

Other objects and advantages of the present invention will become more apparent to those persons having ordinary skill in the art to which the present invention pertains from the following description taken in conjunction with the accompanying drawings.

BRIEF DESCRIPTION OF THE DRAWINGS

FIG. 1 is a side elevational view of an aircraft embodying the present invention.

FIG. 2 is a top plan view of the aircraft of FIG. 1.

FIG. 8 is a side elevational view of another aircraft embodying the present invention.

FIG. 9 is a front elevational view of the aircraft of FIG. 8.

DESCRIPTION OF THE INVENTION

Figure 3:
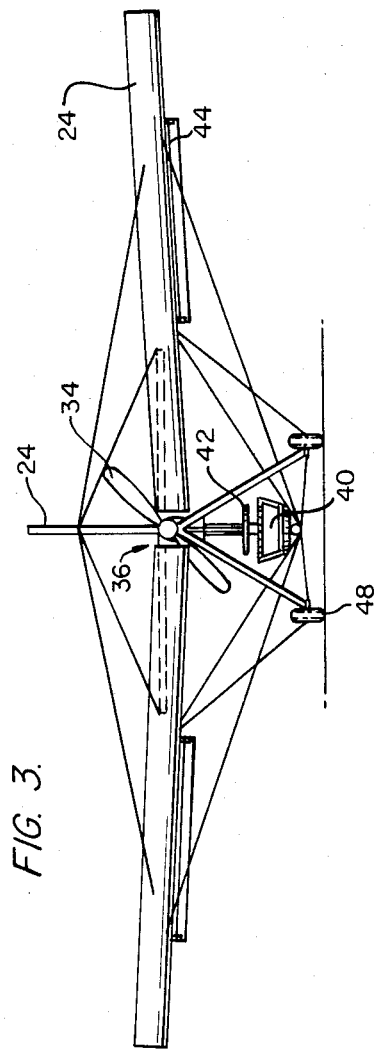
FIG. 3 is a front elevational view of the aircraft of FIG. 1.

Referring to FIGS. 1 through 3 of the drawings, there is illustrated a preferred embodiment of the present invention. Generally, this embodiment consists of a lightweight aircraft shown generally at 20 having a longitudinally disposed, principal load-carrying structural member or boom 22. A wing assembly 24 is mounted at a forward location of boom 22. Tail fin 26, rudder 28, and elevator assembly 30 are mounted to the aft portion of boom 22. Engine 32 and propeller 34 are mounted on boom 22 by mounting system shown generally at 36 between the wing and tail assemblies.

The pilot's station is shown generally at 38 and is disposed, as best shown in FIGS. 1 and 3, at a lower forward location of aircraft 20. Pilot's station 38 includes a seat 40 having suitable framing and body support material secured to the framing. Operator's control stick 42 formed in an inverted T shape is attached at its upper portion to boom 22 at its forward tip, and is positioned so that it can be easily operated by the seated pilot. Control stick 42 is operatively connected to flaps 44 of wing structure 24 and to the elevator and tail assembly. The present invention further contemplates that the engine controls are additionally mounted on control stick 42. Further description of control stick 42 is found in applicant's copending application, Ser. No. 361,859, filed Mar. 23, 1982, whose disclosure is hereby incorporated by reference in its entirety. Referring to FIG. 1, it is seen that seat 40 is supported by a longitudinal member 45 and by an inclined upright member 46. Wheels 48, 48 are rotatably mounted at the lower ends of support members 50, 50, and forward wheel 52 is mounted at the forward end of member 44. Members 54 and 56 provide additional structural support, as does bracing member 58 mounted therebetween. Suitable guide wires 60 are provided where necessary as well.

Figure 4:
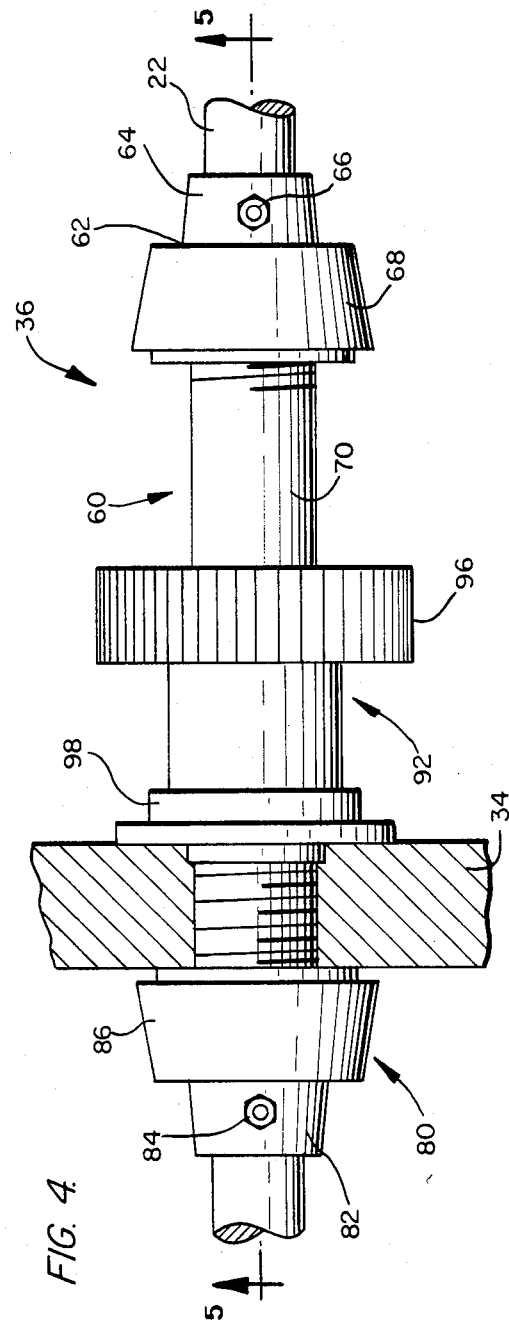
FIG. 4 is a top plan view of the novel mounting system shown in FIG. 1; for clarity's sake, the mounting system is shown in isolation and the engine is not shown.
Figure 7:
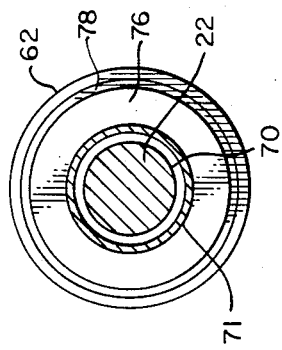
FIG. 7 is a cross-sectional view taken along line 7—7 in FIG. 5.
Figure 5:
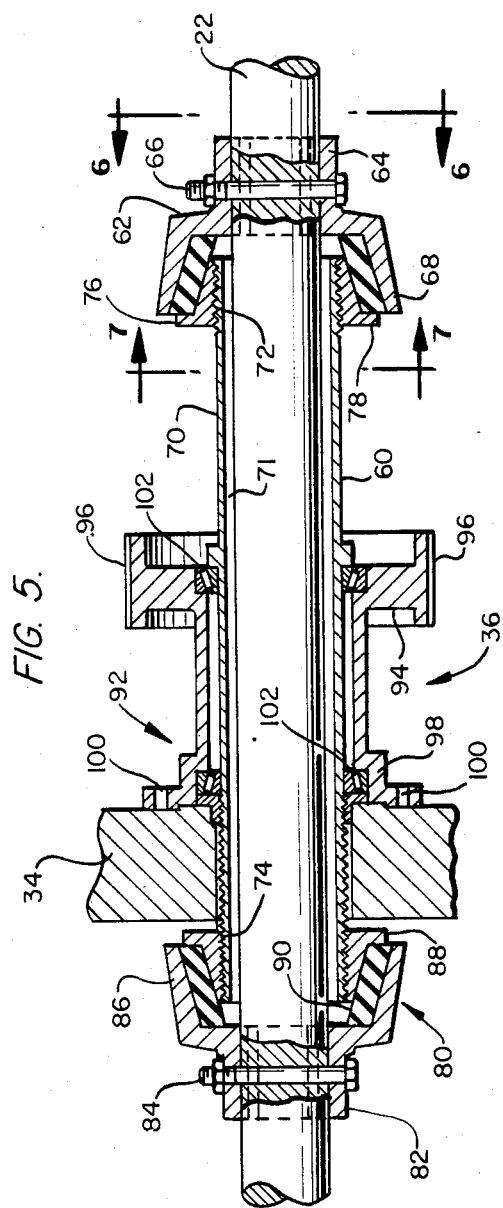
FIG. 5 is a cross-sectional view taken along line 5—5 in FIG. 4.
Figure 6:
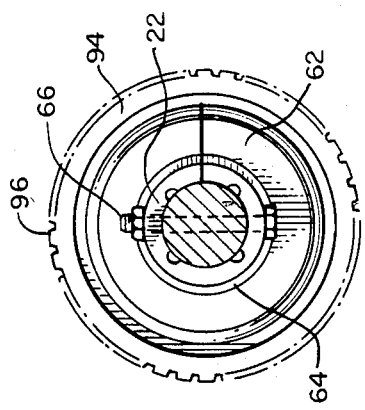
FIG. 6 is a cross-sectional view taken along line 6—6 in FIG. 5.

Mounting system 36 is shown in greater detail in FIGS. 4 through 7. The propeller is rotatably mounted about boom 22 and a space 60 is shown in FIGS. 4 and 5 in which engine 32 can be mounted by brackets or any other conventional means. The mounting system at its forward location includes an aft facing cup 62 having a forward portion 64 which is shaped to fit snuggly against boom 22 and is firmly held thereto by bolt 66. It also includes a larger conical member 68 which is spaced from boom 22. A sleeve 70 is positioned around boom 22 and vibrational dampening material 71 is disposed between them. Sleeve 70 has threaded portions 72 at its forward end and 74 at its aft end. A threaded cup 76 is provided and it can be threaded along threads 72 toward and away from conical member 68. A conical shaped rubber ring 78 is plced between cup 76 and conical member 68. As cup 76 is threaded towards member 68, ring 78 is placed in compression. This provides for a secure and adjustable attachment of sleeve 70 and thus mounting system 36 to boom 22. It further provides for an adjustable system which can accommodate different manufacturing part tolerances as well as part expansions and wear. Also, rubber ring 78 constitutes a vibrational dampening means, supplementing the vibrational dampening material 71 disposed between sleeve 70 and boom 22. A similar attachment means is found at the aft portion of the mounting system. It includes a cup shown generally at 80 having portion 82 secured to the boom by bolt 84 and a larger conical member 86 spaced from boom 22. A cup 88 having threaded portions adapted to be theaded on threads 74 is positioned about sleeve 70. A rubber ring 90 is positionable between cup 88 and conical member 86. As described for ring 78, ring 90 is placed in varying compressions depending upon the position of conical member 86, which may be screwed along sleeve 70 until ring 90 has been subjected to the desired pressure and the mounting system is firmly mounted. Ring 90 also provides an additional vibrational dampening means.

A driving sleeve shown at 92 is positioned about sleeve 70 between propeller 34 and engine 32. Driving sleeve 92 has a flanged portion 94 which has a grooved surface 96 adapted to engage a belt or similar drive means from the engine. A propeller attachment flange 98 is provided at the end of driving sleeve 92. Bolts or similar connection means 100 fixedly attach propeller 34 to flange 98. Thus, as the engine belt (not shown) engages surface 96 of flanged portion 94 and causes it to rotate about sleeve 70, flange 98 is rotated as well. This causes the propeller mounted thereto to rotate about boom 22, thus propelling aircraft 20. Driving sleeve 92 is rotatable about roller bearings 102 which are provided with suitable oil seals.

Thus, it is readily seen that the mounting system can be easily constructed by positioning sleeve 70 and vibration dampening material 71 about the proper location of boom 22. Driving sleeve 92 is disposed about sleeve 70. Cups 76 and 88 are threaded onto the ends of sleeve 70, and vibrational dampening rings 78 and 90 are placed forward and aft of cups 76 and 88 respectively. Cups 62 and 80 can be then bolted to the boom. Cups 76 and 88 can be adjusted to obtain the desired fit and compression. The propeller and the engines can likewise be mounted on sleeve 70.

Referring to FIGS. 8 and 9, it is apparent that the mounting system can be used also on a lightweight biplane aircraft shown generally at 103. Briefly, mounting device shown generally at 104 in those figures is shown mounted to boom 106. Propeller 108 and engine 110 are mounted to mounting device 104 as was previoiusly done with mounting system 36. A tail structure shown generally at 112 is mounted to the aft end of boom 106. The wing structure comprises a pair of parallel wings 114 and 116. Wing 114 is attached to boom 106 and lower wing 116 is attached to lower boom 118. Struts 120 and 122 provide additional support. The operator'station shown generally at 124 includes an operator's seat 126 and a control stick 128 positioned in fron of seat 126. Suitable wheels 130, 130 are rotatably mounted underneath aircraft 103.

From the foregoing detailed description it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A device for mounting an aircraft engine and a propeller on a longitudinal member of an aircraft comprising:
   a sleeve having first and second ends disposed about said longitudinal member,
   a securing means for preventing longitudinal movement of said sleeve relative to said longitudinal member,
   a vibration dampening means disposed between at least a portion of said securing means and said sleeve,
   an engine mounting means for mounting said engine on said sleeve, and
   an attaching means on said sleeve for attaching said propeller for rotation about said sleeve,
   said propeller being rotatable about the longitudinal axis of said longitudinal member.

2. The device according to claim 1 further comprising:
   a driving means attached to said propeller, rotatable about said sleeve, and operatively connected to said engine for driving said propeller.

3. The device according to claim 2 further comprising:
   a bearing means disposed between said driving means and said sleeve.

4. The device according to claim 1 wherein,
   said securing means includes a flange member secured directly to said longitudinal member adjacent said first end, an adjustable member mounted on said sleeve on said first end, and an adjusting means for adjusting the position of said adjustable member along said first end, and
   at least a portion of said vibration dampening means is disposed between said flange member and said adjustable member.

5. The device according to claim 4 wherein,
   said adjusting means includes matched threaded portions on said first end and on said adjustable member so that as said adjustable member is screwed along said longitudinal member said vibration dampening means is subjected to varying compressions.

6. The device according to claim 4 wherein,
   said securing means further includes a second flange member secured directly to said longitudinal member adjacent said second end, a second adjustable member mounted on said sleeve on said second end, and a second adjusting means for adjusting the position of said second adjustable member along said second end, and at least a portion of said vibration dampening means is disposed between said second flange member and said second adjustable member.

7. The device according to claims 4 or 6 wherein, said vibration dampening means comprises a rubber ring.

8. The device according to claim 1 further comprising:
a dampening means disposed between said sleeve and said longitudinal member for dampening vibrations.

9. The device according to claim 2 wherein, said securing means includes a flange member secured directly to said longitudinal member adjacent said first end, an adjustable member mounted on said sleeve on said first end, and an adjusting means for adjusting the position of said adjustable member along said first end, and at least a portion of said vibration dampening means is disposed between said flange member and said adjustable member.

10. The device according to claim 9 wherein, said adjusting means includes matched threaded portions on said first end and on said adjustable member positioned so that as said adjustable member is screwed along said longitudinal member said vibration dampening means is subjected to varying compressions.

11. The device according to claim 9 wherein, said securing means further includes a second flange member secured directly to said longitudinal member adjacent said second end, a second adjustable member mounted on said sleeve on said second end, and a second adjusting means for adjusting the position of said second adjustable member along said second end, and at least a portion of said vibration dampening means is disposed between said second flange member and said second adjustable member.

12. The device according to claims 9 or 11 wherein, said vibration dampening means comprises a rubber ring.

13. The device according to claims 9 or 11 further comprising:
a dampening means disposed between said sleeve and said longitudinal member for dampening vibrations.

14. A lightweight aircraft comprising:
a longitudinally disposed load-carrying member,
a wing structure mounted on said load-carrying member,
a rudder and elevator assembly mounted on said load-carrying member aft or said wing structure,
a propeller positioned between said wing structure and said rudder and elevator assembly for rotation about a longitudinal centerline of said load-carrying member,
an adjustable mounting means for mounting said propeller on said load-carrying member,
said adjustable mounting means including a sleeve having first and second ends disposed about said longitudinal member, a securing means for preventing longitudinal movement of said sleeve relative to said longitudinal member, a vibration dampening means disposed between at least a portion of said securing means and said sleeve, an engine mounting means for mounting said engine on said sleeve, and an attaching means on said sleeve for rotatably attaching said propeller to said sleeve,
an engine connected to said load-carrying member, and
a connecting means drivingly connecting said engine to said propeller.

15. The aircraft according to claim 14 wherein, said load-carrying member is the principal longitudinal load-carrying member.

16. The aircraft according to claim 14 wherein, said propeller comprises the only propelling means for said aircraft.

17. The aircraft according to claim 14 wherein, said connecting means includes a speed reduction means between said engine and said propeller.

18. The aircraft according to claim 14 wherein, said wing structure is the principle lift generating structure for said aircraft.

19. The aircraft according to claim 14 further comprising:
a driving means attached to said propeller, rotatable about said sleeve, and operatively connected to said engine for driving said propeller.

20. The aircraft according to claim 19 further comprising:
a bearing means disposed between said driving means and said sleeve.

21. The aircraft according to claim 14 wherein, said securing means includes a flange member secured directly to said longitudinal member adjacent said first end, an adjustable member mounted on said sleeve on said first end, and an adjusting means for adjusting the position of said adjustable member along said first end, and at least a portion of said vibration dampening means is disposed between said flange member and said adjustable member.

22. The aircraft according to claim 21 wherein, said adjusting means includes matched threaded portions on said first end and on said adjustable member so that as said adjustable member is screwed along said longitudinal member said vibration dampening means is subjected to varying compressions.

23. The aircraft according to claim 21 wherein, said securing means further includes a second flange member secured directly to said longitudinal member adjacent said second end, a second adjustable member mounted on said sleeve on said second end, and a second adjusting means for adjusting the position of said second adjustable member along said second end, and at least a portion of said vibration dampening means is disposed between said second flange member and said second adjustable member.

24. The aircraft according to claims 21 or 23 wherein, said vibration dampening means comprises a rubber ring.

25. The aircraft according to claims 14, 21 or 23 further comprising:
a dampening means disposed between said sleeve and said longitudinal member for dampening vibrations.

26. The aircraft according to claim 14 wherein, said wing structure comprises a pair of parallel wings.

* * * * *